United States Patent Office 3,465,416
Patented Sept. 9, 1969

3,465,416
BONDING DIAMONDS TO METAL BASES
William W. Wellborn, Milford, Mich. (30231 Stephenson Highway, Madison Heights, Mich. 48071)
No Drawing. Continuation-in-part of application Ser. No. 212,730, July 26, 1962. This application Nov. 17, 1965, Ser. No. 508,394
Int. Cl. B23k *31/00;* B44d *1/44*
U.S. Cl. 29—473.1
5 Claims

ABSTRACT OF THE DISCLOSURE

A method of preparing diamonds for bonding to a metal base comprising the steps of bringing the surface of the diamond into contact with a salt of a metal binder having an affinity for carbon, depositing an elementary ionic size coating of the metal constituent on the surface of the diamond, and thereafter heating the coated diamond at an elevated temperature slightly below the melting point of the metal binder.

---

This application is a continuation-in-part of my copending application Ser. No. 212,730, filed July 26, 1962 and now abandoned.

This invention relates to bonding diamonds to metal bases.

A major problem in the industrial use of diamonds is the inability to securely hold the diamond on a support such as a metal base. Thus, it is common to embed the diamonds in a relatively softer matrix, clamp the diamonds or otherwise mechanically hold the diamonds. Although attempts have been made to produce a metallurgical bond of diamonds to a metal base, none has been fully successful.

It is an object of this invention to provide a method of bonding diamonds to metal bases wherein a metal bond is achieved.

It is a further object of the invention to provide diamonds which are suitably treated so that they can readily be mounted on a metal base by soldering to produce a metallurgical bond.

Basically, the invention comprises applying a very fine coating of a metal binder having an affinity for carbon to a surface of the diamond and heating the diamond and the coating at a temperature slightly below the melting point of the metal binder. This produces a diamond surface which can be readily soldered to a metal base by using a solder compatible with the metal binder and thereby producing a metallurgical bond. The resultant bond between the diamond and the metal base is stronger than has heretofore been achieved by any known method.

In accordance with the invention, the very fine coating of the metal binder is applied by precipitating an elementary metal from a solution which is in contact with the diamonds or by reducing a salt of the metal binder to produce the elementary metal coating on the diamonds.

The temperature at which the diamond is heated to bond the metal binder to the diamond is slightly below the melting point of the metal binder.

Suitable metal binders will be readily apparent to persons skilled in the art. Thus iron, tungsten, tantalum and molybdenum, can be used; or cobalt, nickel and silver can be used.

After the diamond has been provided with the coating which is herein referred to as ionic in size, it can be readily soldered to a metal base by utilizing a solder which is compatible with the metal of the ionic coating and the metal base. Such solders will be readily apparent to a person skilled in the art.

Typical examples of coating and bonding diamonds are as follows:

Example I

The diamonds were placed in a solution of a cobalt salt in water to which an active reducing agent, namely, sodium borohydrate, had been added. The solution containing the diamonds was heated at a temperature of 50° C. This provided an ionic size layer of cobalt on the surface of the diamonds. The diamonds were then removed from the solution and heated in a hydrogen atmosphere at a temperature ranging from 2000 to 2500° F. The resultant articles had an ionic size layer of cobalt metallurgically bonded thereto.

These diamonds were then soldered to a steel base with silver solder. Upon test wherein a diamond was bonded to two diametrically opposed bases, it was found that the force required to pull apart the bonded joint was 80 percent greater than had heretofore been possible by any methods known to the inventor.

More specifically, a plating solution was prepared by dissolving 12 grams of $CoCl_2 \cdot 6H_2O$ and 32 grams of Rochelle salt in 400 ml. of water. 500 ml. of ammonium hydroxide was added and the resultant mixture was filtered. Additional water was added to one liter. A stannous chloride solution was made by mixing 20 grams of $SnCl_2$ and 40 ml. of HCl and then diluting with water to one liter. A palladium chloride solution was prepared by mixing 0.1 gram of $PdCl_2$ and 10 ml. of HCl and diluting with water to one liter. A cleaning solution was made by adding water to 250 ml. of $NH_4OH$ to make one liter.

One hundred carats of 40 mesh diamonds were cleaned by boiling for five minutes in the cleaning solution. The diamonds were then rinsed with water and placed in 30 ml. of the stannous chloride solution. The stannous chloride solution containing the diamonds was then boiled for five minutes to activate the surfaces of the diamonds. The diamonds were then rinsed with water and placed in 20 ml. of the palladium chloride solution. The palladium chloride solution containing the diamonds was then boiled for five minutes to further activate the surfaces of the diamonds. The diamonds were then rinsed with water and transferred to a clean container. 0.474 gram of $NaBH_4$ were added to 100 ml. of the cobalt plating solution with stirring. The resultant solution was then poured over the activated diamonds. The solution containing the activated diamonds was carefully heated to 40–50° C. to deposit elementary cobalt on the diamonds and produce the resultant ionic size coating on the diamonds. In this heating procedure, care must be taken to prevent the temperature from exceeding 50° C. The diamonds were then rinsed with water and dried. The diamonds were then placed in a reducing atmosphere and heated to 2000–2500° F., preferably 2100 F. This heating caused the elementary cobalt which was deposited on the diamonds to become metallurgically bonded to the diamonds. The diamonds were then in condition for soldering to a base in the manner described above.

Example II

In this example, a salt of the metal binder is formed into a slurry or paste and poured over the diamonds to give an even coating. The slurry is permitted to dry and then heat is applied to decompose the salt and produce the elementary metal coating on the diamonds. The diamonds are further heated to cause the elementary metal coating to be bonded to the diamonds so that they are in condition for soldering to a base.

More specifically, the diamonds were first cleaned and preferably activated in the manner of Example I. Sodium carbonate was added to a solubue salt of the metal binder, namely, a cobalt chloride to precipitate cobalt carbonate. The cobalt carbonate was filtered and washed. A slurry was formed by mixing one-quarter pound of cobalt carbonate, one quart of acetone and 4 oz. of cellulose acetate. Upon stirring, this formed a thin paste or paint which was then poured over the diamonds and the diamonds were stirred to produce an even coating. The diamonds with this coating were permitted to dry and heat was applied to about 150° C. to decompose the carbonate to cobalt oxide but insufficiently to reduce the cobalt oxide. The diamonds were then placed in a reducing atmosphere and heated to 2000–2500° F., preferably 2100° F. The subsequent heat reduced the cobalt oxide to form the elementary cobalt on the surface of the diamonds and further caused the cobalt to be bonded to a base by soldering.

The manner in which salts of other metallic binders set forth above may be used and decomposed to produce an elementary metal coating on the diamonds will be readily apparent to persons skilled in the art in the light of the teaching of the present invention.

The use of a reducing atmosphere during the heating of the elementary metal coating to cause it to be metallurgically bonded to the diamonds insured that oxidation of the metal binder will not occur. Further, in the case of deposition by the slurry method hereinabove described, the reducing atmosphere facilitates reduction of the oxide.

It can be seen that I have provided a method of bonding diamonds to metal wherein a metallurgical bond is achieved.

I claim:
1. The method of preparing diamonds for bonding to a metal base which comprises the steps of:
   forming a paint of a salt of a metal binder,
   applying the paint to the diamonds,
      thereafter heating the diamonds to dry the paint,
   heating the diamonds to decompose the salt to an oxide, but insufficiently to reduce the oxide,
   thereafter heating the diamonds at an elevated temperature slightly below the melting point of the metal binder.
2. The method set forth in claim 1 including the step of soldering the coated diamond to a metal base by using a solder which is compatible with the metal binder.
3. The method set forth in claim 1 wherein said salt comprises a salt of cobalt,
   said temperature to which the diamonds are heated to decompose the salt being approximately 150° C.,
   said elevated temperature at which the diamonds are thereafter heated comprising 2000–2500° F. and said heat at the elevated temperature being conducted in a reducing atmosphere.
4. The combination set forth in claim 1 wherein said metal binder is selected from the group consisting of cobalt, nickel and iron.
5. The combination set forth in claim 1 wherein said metal binder is selected from the group consisting of iron, tungsten, tantalum, molybdenum, cobalt, nickel and silver.

References Cited

UNITED STATES PATENTS

| | | | |
|---|---|---|---|
| 2,382,666 | 8/1945 | Rohrig et al. | 117—107 X |
| 2,430,581 | 11/1947 | Pessel. | |
| 2,702,253 | 2/1955 | Bergstrom | 117—54 X |
| 3,062,680 | 11/1962 | Meddings. | |
| 3,138,479 | 6/1964 | Foley | 117—47 |
| 3,246,395 | 4/1966 | Galmiche | 29—473.1 X |
| 3,265,528 | 8/1966 | Bond | 117—160 X |

FOREIGN PATENTS

| | | |
|---|---|---|
| 16,881 | 10/1897 | Great Britain. |
| 240,687 | 5/1960 | Australia. |
| 650,637 | 10/1962 | Canada. |

JOHN F. CAMPBELL, Primary Examiner

J. L. CLINE, Assistant Examiner

U.S. Cl. X.R.

117—62.2